A. E. ZOCK.
AGRICULTURAL TRACTOR.
APPLICATION FILED MAR. 5, 1910.
992,100.
Patented May 9, 1911.
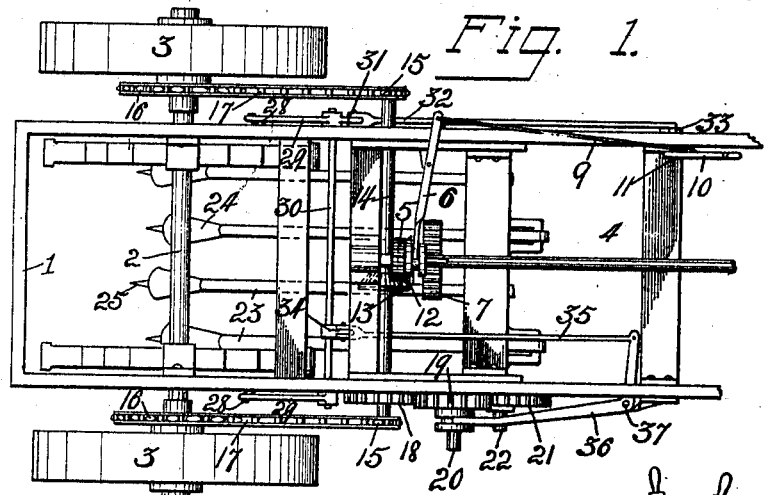
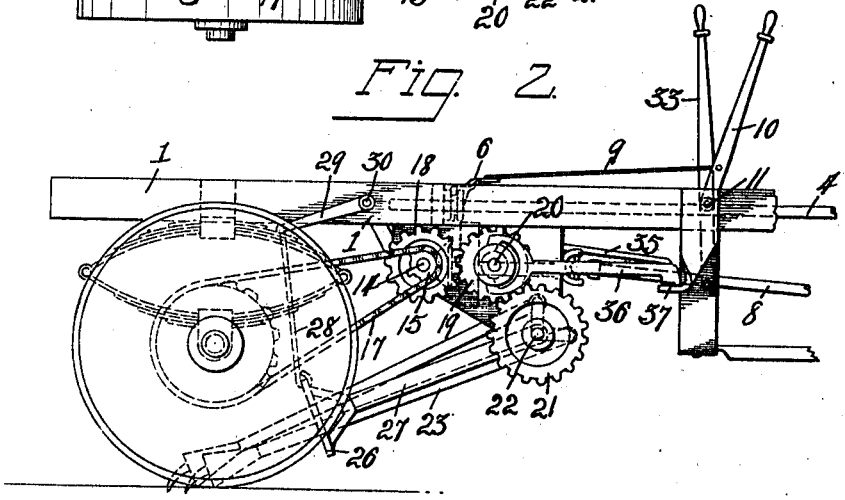
WITNESSES:
C. H. Bills.
E. E. Thomas.
INVENTOR
August E. Zock,
By Owen & Owen,
His attys.

UNITED STATES PATENT OFFICE.

AUGUST E. ZOCK, OF WATERVILLE, OHIO, ASSIGNOR TO THE WATERVILLE TRACTOR COMPANY, OF WATERVILLE, OHIO, A CORPORATION OF OHIO.

AGRICULTURAL TRACTOR.

992,100.  Specification of Letters Patent.  Patented May 9, 1911.

Original application filed May 23, 1908, Serial No. 434,613. Divided and this application filed March 5, 1910. Serial No. 547,576.

*To all whom it may concern:*

Be it known that I, AUGUST E. ZOCK, a citizen of the United States, and a resident of Waterville, in the county of Lucas and State of Ohio, have invented a certain new and useful Agricultural Tractor; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to motor trucks, and has for its object the provision of an improved and highly efficient machine of this class which is simple, strong and durable in its construction, easy of operation, and inexpensive of manufacture, and which is provided with simple and efficient means for controlling the lowering or raising of the push-bars and the simultaneous throwing of the crank-shaft to which they are attached into or out of commission with the actuating mechanism, as the case may be.

The invention is fully described in the following specification and a preferred embodiment of same illustrated in the accompanying drawings, in which,—

Figure 1 is a plan view of the rear portion of a machine embodying my invention. Fig. 2 is a side elevation of the same. Fig. 3 is a face view of the guide-plate for the push-bars.

view of the guide-plate for the push-bars.

This application is a division of an application filed May 23, 1908, and allotted Serial No. 434,613.

Referring to the drawings 1 designates the frame of the machine on which the body or platform is mounted. This frame is supported by the usual front and rear axles 2 carried by wheels 3, the rear ones only of which are shown in the drawings.

The power shaft of the machine is designated 4 and may be driven by any suitable motor. This shaft is mounted in suitable bearings longitudinally of the frame at the middle thereof, and is provided with a shifting-gear 5 which is controlled by a shifting-lever 6, and may be moved into or out of mesh with a gear 7 carried by the shaft 8. The shifting-lever 6 has connection through a rod 9 with a controlling-lever 10 fulcrumed to the frame 1 as at 11. The shaft 8 is mounted in suitable bearings longitudinally of the frame 1 beneath the shaft 4 and carries a bevel gear 12 at its rear end in mesh with and operating a beveled and differential gear 13 on the jack or cross shaft 14 mounted transversely of the frame in suitable bearings provided therefor. This shaft carries sprocket wheels 15 at its ends which are connected to sprocket-wheels 16 on the hubs of the rear wheels 3 by means of the sprocket chains 17, thus providing drive means for the rear wheels of the truck. The shaft 14 also carries at one end a spur-gear 18, which, through an intermediate shifting-pinion 19, on a stub shaft 20, drives a gear 21 on one end of a crank-shaft 22. This crank-shaft is mounted transversely of the frame 1 and is shown in the present instance as having 4 cranks set on quarters to each of which the forward end of a push-bar 23 connects. Each of these push-bars is provided at its foot with a conical block or enlargement 24, which has its small end forward and a spur 25 projecting centrally from its rear or large end, to facilitate a firm engagement of the same with the surface over which they are traveling when in action. The push-bars 23 trail under the rear of the machine and work through vertically elongated openings 26′ in a guide-plate 26 which is suspended beneath the machine transversely thereof by arms 27 connected to the shaft 22 and by hangers 28 connected to arms 29 projecting from a cross-shaft 30. This cross-shaft is journaled in the frame 1 and has a crank arm 31 connected, by a rod 32, to a hand lever 33, which hand lever controls the oscillation of the shaft 30 to effect a raising or lowering of the guide-plate 26 and push-bars. The pinion 19 is also shifted on its shaft when the shaft 30 is rocked due to an arm 34 on said latter shaft and a link or rod 35 communicating motion to the bell-crank shifting-lever 36, which is fulcrumed to the frame as at 37 and has an end in engagement with the peripherally curved hub of the pinion 19 as shown. The connection between the shaft 30 and pinion 19 is such that the crank-shaft 22 is thrown into gear with the driving mechanism when the push-bars are lowered into operative position and vice versa. It is thus apparent that I have provided both wheel and push-bar propeller mechanisms which are capable of acting together to propel the vehicle and simple and efficient means for throwing the push-bar mechanism into driving commission when the push-bars are lowered, and of disconnecting such mechanism from the driving mechanism when the push-bars are raised.

I wish it understood that my invention is not limited to any specific construction or arrangement of the parts except in so far as such limitations are specified in the claims.

Having thus described my invention, what I claim as new and desire to secure by Letters Patent, is,—

1. In a motor driven vehicle, the combination of the drive wheels, a crank shaft, pusher bars attached to the crank shaft, a driven shaft, means connecting said driven shaft and drive wheels for communicating rotation from one to the other, a gear on each of said crank and driven shafts, a shiftable pinion capable of movement to mesh with said gears, and means operative to simultaneously lower the pusher bars and shift said pinion to mesh with said gears and vice versa.

2. In a motor driven vehicle, the combination of the drive wheels, a driven shaft in driving connection with such wheels, a crank shaft, pusher bars attached to such crank shaft, a guide member for such pusher bars capable of vertical movements to raise and lower such bars, a gear on each of said shafts, a pinion shiftable to release or engage such pinions, and means operative by the movement of a single lever to effect a lowering and raising of said guide member and movements of the pinion to engage or release said gears.

In testimony whereof, I have hereunto signed my name to this specification in the presence of two subscribing witnesses.

AUGUST E. ZOCK.

Witnesses:
C. W. OWEN,
C. H. BILLS.

---

Copies of this patent may be obtained for five cents each, by addressing the "Commissioner of Patents, Washington, D. C."